United States Patent [19]

Tanaka

[11] Patent Number: 5,247,508
[45] Date of Patent: Sep. 21, 1993

[54] LASER ADJUSTING APPARATUS TRACKING CONTROL FOR USE WITH AN OPTICAL DISC

[75] Inventor: Akihiro Tanaka, Tokyo, Japan

[73] Assignee: Asahi Kogaku Kogyo Kabushiki Kaisha, Tokyo, Japan

[21] Appl. No.: 808,687

[22] Filed: Dec. 17, 1991

[30] Foreign Application Priority Data

Dec. 17, 1990 [JP] Japan .............................. 2-406424[U]

[51] Int. Cl.$^5$ .............................................. G11B 7/00
[52] U.S. Cl. .................................. 369/112; 369/44.14
[58] Field of Search ................. 369/112, 44.14, 44.11, 369/110, 109, 44.17, 44.22, 44.18, 44.19, 44.21

[56] References Cited

U.S. PATENT DOCUMENTS

| | | | |
|---|---|---|---|
| 3,944,727 | 3/1976 | Elliott | 369/44.14 |
| 3,978,278 | 8/1976 | Bouwhuis et al. | 369/112 |
| 5,072,436 | 12/1991 | Honda | 369/112 |

FOREIGN PATENT DOCUMENTS

| | | |
|---|---|---|
| 60-40029 | 3/1985 | Japan . |
| 61-137234 | 6/1986 | Japan . |
| 62-143236 | 6/1987 | Japan . |
| 63-160024 | 7/1988 | Japan . |
| 63-311225 | 12/1988 | Japan . |

OTHER PUBLICATIONS

English Abstract to Japanese Patent No. 61-137234.
English Abstract to Japanese Patent No. 62-143236.
English Abstract to Japanese Patent No. 63-160024.
English Abstract to Japanese Patent No. 63-311225.
English Abstract to Japanese Patent No. 60-40029.

Primary Examiner—Aristotelis Psitos
Assistant Examiner—P. W. Huber
Attorney, Agent, or Firm—Sandler, Greenblum & Bernstein

[57] ABSTRACT

A laser adjusting apparatus includes a laser source, a galvanomirror unit having a galvanomirror which reflects a laser beam from the laser source, and a device which adjusts the direction of the galvanomirror thereby changing the direction of the laser beam reflected by the galvanomirror. A second mirror which reflects the primary reflection light reflected by the galvanomirror unit toward the galvanomirror unit is also provided and a device which reflects the secondary reflection light reflected by the second mirror is made incident upon and reflected by the galvanomirror unit.

12 Claims, 7 Drawing Sheets

Fig. 8 PRIOR ART

LASER ADJUSTING APPARATUS TRACKING CONTROL FOR USE WITH AN OPTICAL DISC

BACKGROUND OF THE INVENTION

1. Field of the Invention

The present invention relates to an optical disc apparatus such as an optical information recording and reproducing apparatus or optical information reproducing apparatus for recording information on an optical disc, such as a photo magnetic disc, and/or reproducing the recorded information, and more specifically it relates to a laser adjusting apparatus thereof.

2. Description of Related Art

In a known optical disc apparatus, an objective lens which converges a laser beam from a laser source onto an optical disc, and/or receives light reflected by the optical disc, is linearly moved back and forth in the radial direction across the tracks of the optical disc. In such an optical disc apparatus, light from the laser source is made parallel with the direction of movement of the objective lens in a vertical plane lying in the radial direction of the optical disc by a galvanomirror unit. The galvanomirror unit varies the angle of the galvanomirror to change the direction of light reflected thereby, so that the reflected laser is made parallel with the linear direction of movement of the objective lens.

Figure 8:
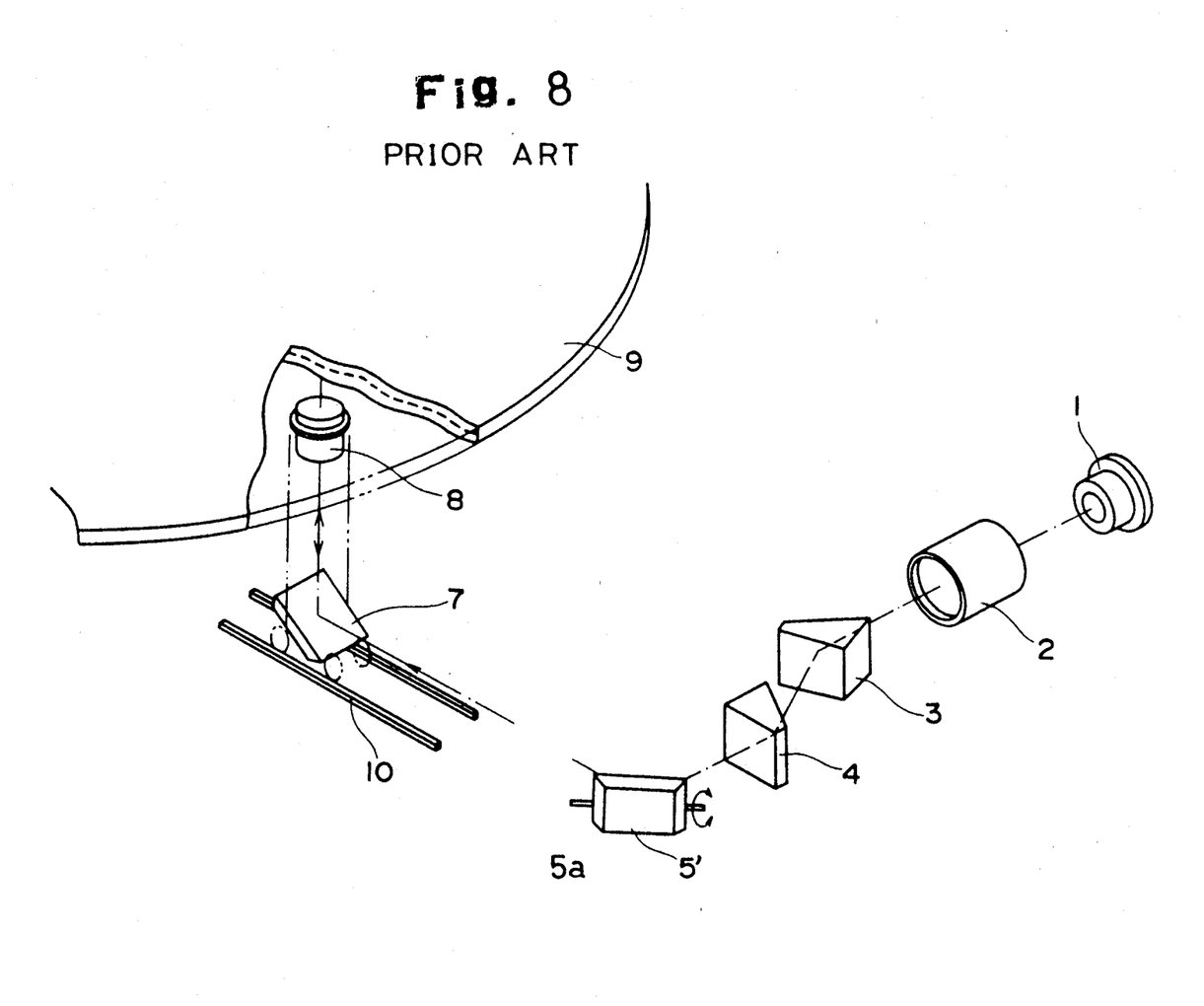

FIG. 8 shows a known optical disc apparatus including a galvanomirror unit, in which light (laser beam) from a laser source 1 is collimated by a collimating lens 2 and is shaped into a circular light flux by first and second beam shaping prisms 3 and 4, respectively. The shaped light is then reflected by a galvanomirror unit 5' to be made incident on an objective lens 8, opposed to optical disc 9, which is moved on and along guide rails 10 together with a movable mirror 7. The galvanomirror unit 5' is rotatable about a horizontal shaft 5a, so that the direction of light reflected thereby can be made parallel with the linear direction of movement of the objective lens 8, i.e., the lengthwise direction of the guide rails 10, by adjusting the angle of the galvanomirror 5'. The direction of the laser is adjusted in the vertical plane lying in the radial direction of the optical disc 9 by the galvanomirror unit 5'. Note that the galvanomirror unit 5' can not adjust the direction of the laser in a horizontal plane.

In the known optical system as mentioned above, the deflection angle of the laser beam reflected by the galvanomirror unit 5' is equal to 2 times the angular displacement (angle) of the galvanomirror unit 5'. Consequently, the velocity "v" of the laser beam moved in the radial direction of the optical disc 9 through the objective lens 8 by the galvanomirror unit 5' is given by:

$$v = 2f\beta$$

wherein f designates the focal length of the objective lens 8 and $\beta$ the rotational angular velocity of the galvanomirror unit 5'.

The focal length of the objective lens 8 is usually fixed at a predetermined value, and accordingly, it is necessary to move the galvanomirror unit 5' at high speed to effect a quick tracking control. However, since the galvanomirror unit 5' is relatively heavy, it is very difficult to control high speed rotation and quick stopping of the galvanomirror unit 5' due to its inertia. This limits the speed of the tracking control.

SUMMARY OF THE INVENTION

The primary object of the present invention is to provide a laser adjusting apparatus in which tracking control can be effected at high speed.

To achieve the object mentioned above, according to an aspect of the present invention, there is provided a laser adjusting apparatus including a laser source, a galvanomirror unit including a galvanomirror which reflects the laser from the laser source, and a direction adjusting means for adjusting the direction of the galvanomirror to change the direction of the laser reflected by the galvanomirror, a second mirror which reflects the primary reflection light reflected by the galvanomirror unit toward the galvanomirror unit, and a reflecting means for reflecting the secondary reflection light reflected by the second mirror to be made incident upon and reflected by the galvanomirror unit.

According to another aspect of the present invention, there is provided an optical disc apparatus having a laser source, a beam splitter having a semitransparent film which permits linearly polarized light from the laser source to pass therethrough and reflects linearly polarized light having a difference in direction from the first mentioned linearly polarized light of 90° in the radial direction of an optical disc, a galvanomirror unit including a galvanomirror which upwardly reflects the laser beam transmitted through the beam splitter at a substantially right angle and a direction adjusting means for rotating the galvanomirror about a horizontal axis in an incident plane thereof to change the direction of the laser beam reflected by the galvanomirror, a second mirror which reflects the laser beam reflected by the galvanomirror unit toward the galvanomirror unit, a ¼ wave plate provided between the second mirror and the galvanomirror unit, and a reflecting mirror along with an objective lens for converging the laser beam reflected by the semitransparent film of the beam splitter onto a predetermined track of the optical disc.

According to still another aspect of the present invention, there is provided a laser beam adjusting apparatus, for changing the direction of a laser beam to be made incident upon an optical disc in a vertical plane lying in the radial direction of the optical disc, which includes a normal to a plane of the optical disc comprises a galvanomirror unit for reflecting a laser beam from the laser source to change the direction of the laser beam, and means for making the laser beam, which is reflected twice by the galvanomirror unit, incident upon the optical disc.

According to still another aspect of the present invention, a galvanomirror unit is provided having a galvanomirror which reflects a laser beam from a laser source toward an objective lens which moves linearly in the radial direction of the optical disc, a stationary mirror which reflects a primary reflection light reflected from the galvanomirror to return it to the galvanomirror, and a semitransparent film provided between the laser source and the galvanomirror to reflect a secondary reflection light from the galvanomirror toward the objective lens.

With the construction mentioned above, since the laser beam from the laser source is reflected twice by the galvanomirror and is then made incident upon the objective lens, the speed of movement of the laser beam on the optical disc with respect to the angular displacement of the galvanomirror can be increased, resulting in a quick tracking control.

The present disclosure relates to subject matter contained in Japanese Utility Model Application No.2-406424 (filed on Dec. 17, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
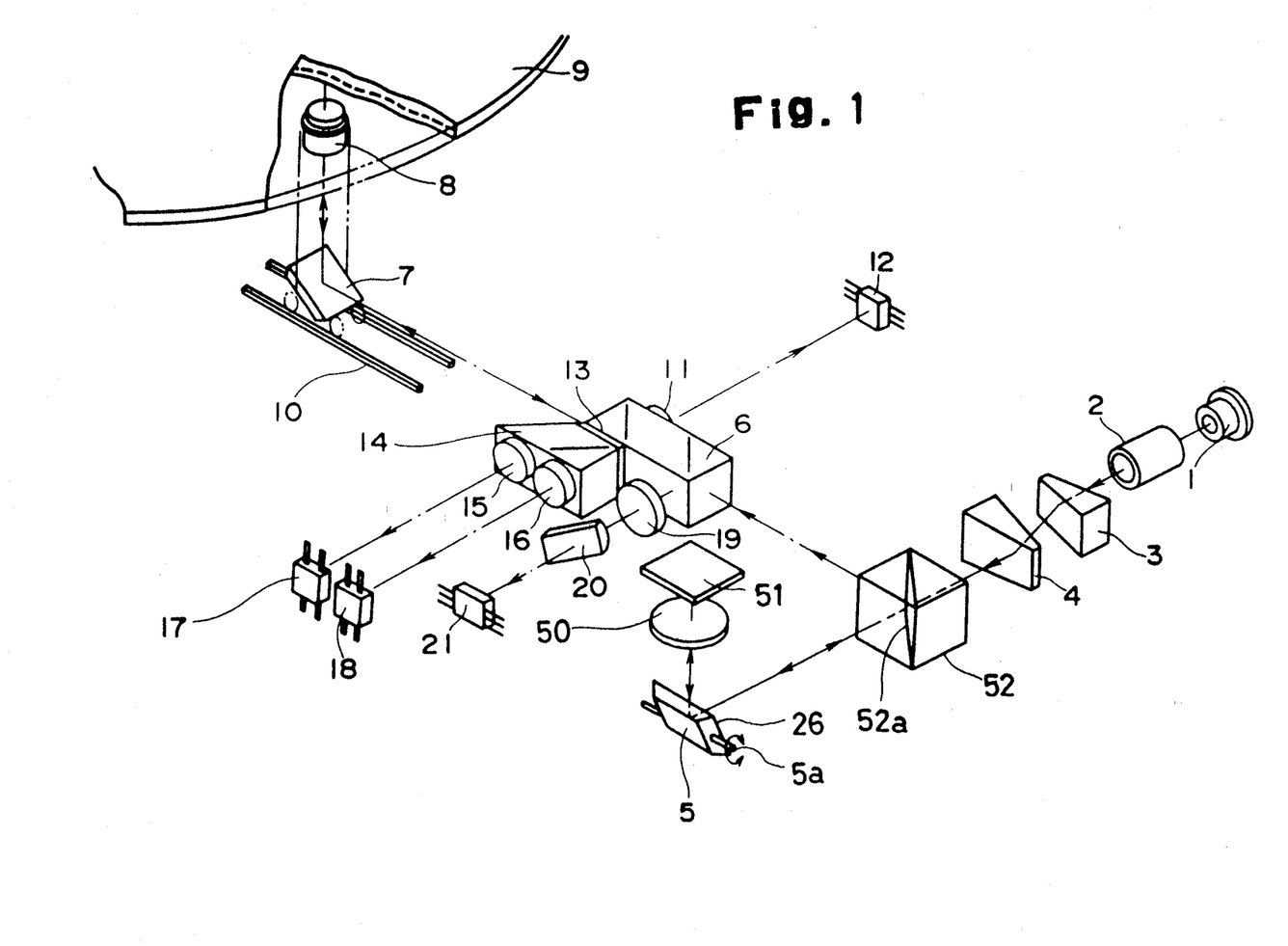
FIG. 1 is a schematic perspective view of an optical disc apparatus having a laser adjusting apparatus according to the present invention.
Figure 2:
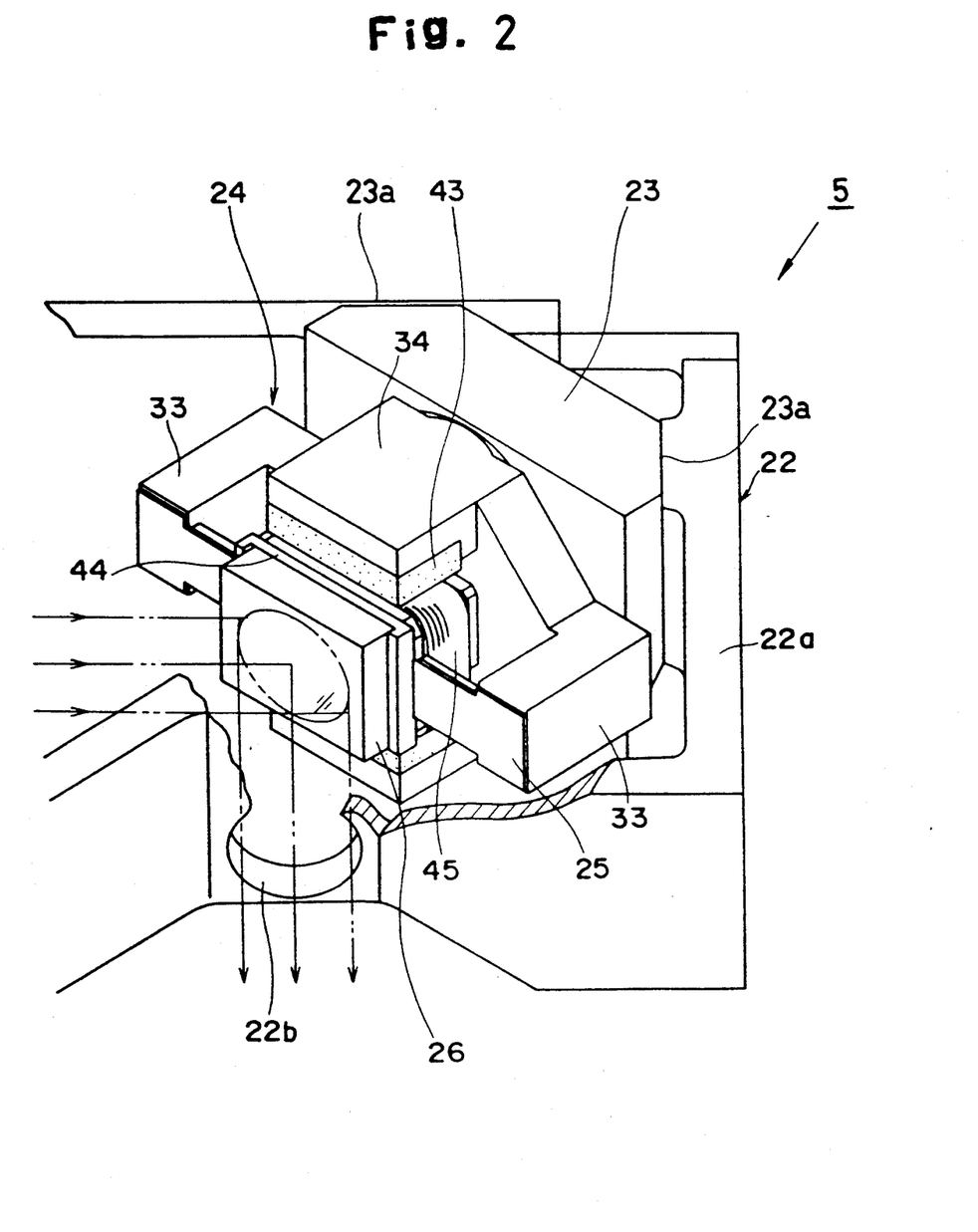
FIG. 2 is a perspective view of a laser adjusting apparatus according to the present invention.
Figure 3:
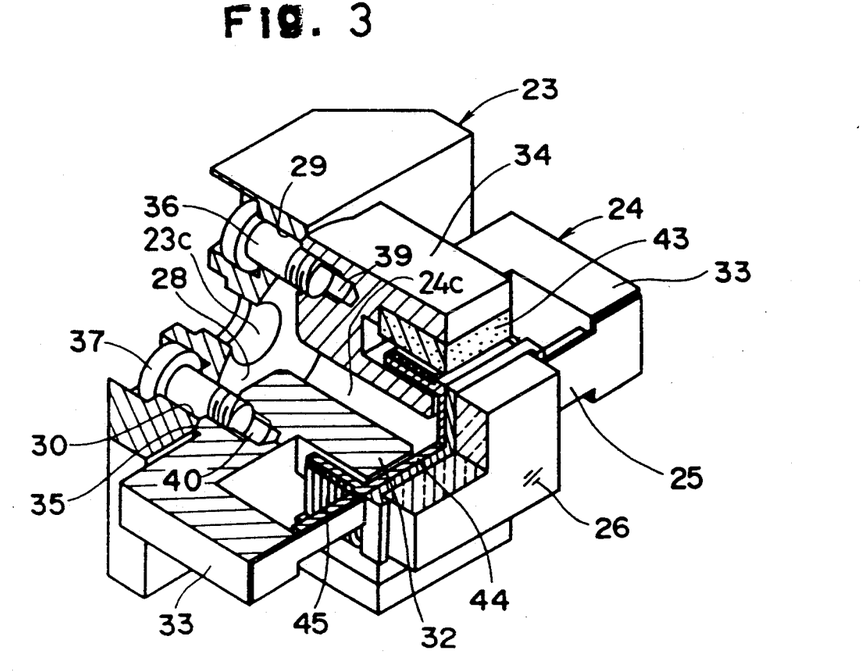
FIG. 3 is a partially broken perspective view of the laser adjusting apparatus shown in FIG. 2.

FIG. 1 shows an optical disc apparatus to which the present invention is applied. In FIG. 1, the laser beam emitted from a laser source 1, such as a semiconductor laser or the like, is collimated by a collimating lens 2 and is then shaped into a circular light flux by first and second beam shaping prisms 3 and 4 to be made incident upon a beam splitter 52. The light transmitted through the beam splitter 52 is made incident on a galvanomirror unit 5.

Figure 7:
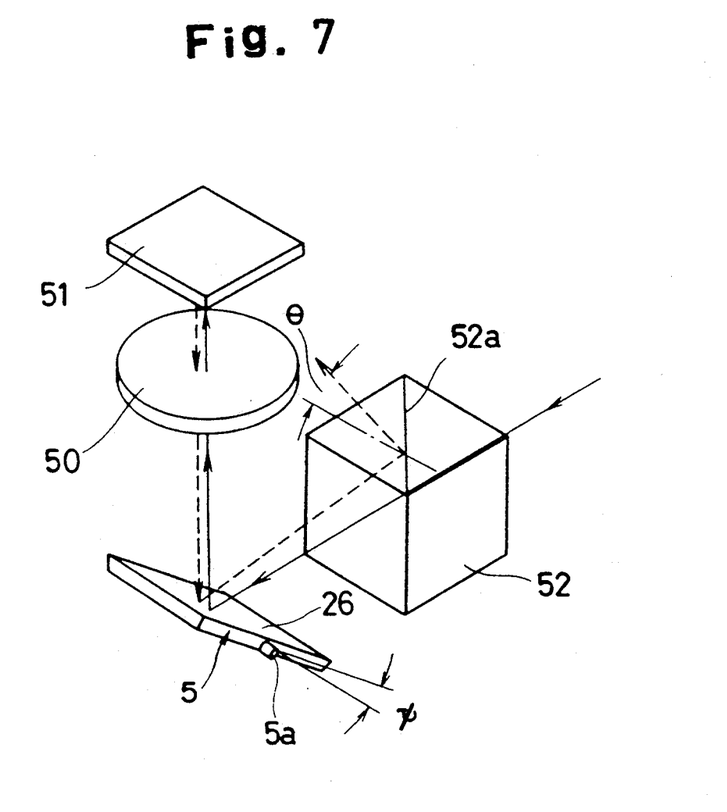
FIG. 7 is an enlarged perspective view of a main part of a laser adjusting apparatus shown in FIG. 2; and, FIG. 8 is a schematic perspective view of a known optical disc apparatus having a galvanomirror unit.

As can be seen in FIGS. 1 and 7, a ¼ wave plate 50 is provided directly above the galvanomirror unit 5 and a stationary mirror 51 having a lower reflecting surface is provided directly above the ¼ wave plate 50. The beam splitter 52, provided between the galvanomirror unit 5 and the second beam shaping prism 4, has a semitransparent film 52a which is inclined at 45° in the horizontal direction with respect to the galvanomirror unit 5 and the movable mirror 7.

Galvanomirror unit 5 includes galvanomirror 26 which is rotatable about a horizontal shaft 5a to change the angle thereof in the vertical direction. According to one of the most significant features of the present invention, the reflecting surface of the mirror 26 is facing upward and inclined at an angle of 45 with respect to both the vertical and horizontal directions (FIGS. 1 and 7).

Consequently, the light reflected by the mirror 26 of the galvanomirror unit 5 is reflected back toward the mirror 26 by the stationary mirror 51 to be reflected again toward the beam splitter 52, the light is then reflected by the semitransparent film 52a of the beam splitter 52 and is then transmitted through a main beam splitter 6. The light is then reflected by the movable mirror 7 and is focused on the optical disc 9 by the objective lens 8. The movable mirror 7 and the objective lens 8 are integrally supported by a supporting member (not shown) which is linearly moved on and along the guide rails 10 which extend in the radial direction of the optical disc 9 across either spiral or concentric tracks of the optical disc 9.

The light reflected by the galvanomirror unit 5 is partly reflected by the main beam splitter 6 to be made incident upon an APC (Auto Power Control) sensor 12 for controlling the laser output through a condenser lens 11.

The light reflected by the optical disc 9 is again reflected by the movable mirror 7 and then made incident upon the main beam splitter 6 from the opposite direction. The main beam splitter 6 splits the light into light which is incident upon an auxiliary beam splitter 14 through a ¼ wave plate 13 and light which is reflected by the main beam splitter 6 is made incident upon a servo-sensor 21 which controls the focusing and tracking through a condenser lens 19 and a cylindrical lens 20. The light incident upon an auxiliary beam splitter 14 is split and made incident upon an S-polarized light data sensor 17 and a P-polarized light data sensor 18 for reproducing the signals through condenser lenses 15 and 16, respectively.

If there is a tracking error, i.e., the light is not correctly focused on a predetermined track of the optical disc 9, the galvanomirror unit 5 rotates about the horizontal shaft 5a to vary the direction of the reflecting surface of the mirror 26 about a horizontal axis (pitch direction) in accordance with the tracking error signal output from the servo-sensor 21. As a result, a slight displacement of the focal point of the laser on the optical disc 9 takes place in the radial direction (track direction) of the optical disc 9 to correct the tracking error, thereby carrying out the tracking function.

In the optical disc apparatus as mentioned above, the laser emitted from the laser source 1 is shaped into a circular light flux by the first and second beam shaping prisms 3 and 4 and is then transmitted through the beam splitter 52 in the horizontal direction, as shown by the solid line in FIG. 7. The light is vertically reflected by the galvanomirror unit 5 through an angle of 90° (primary reflection). The reflected light is then circularly polarized by the ¼ wave plate 50 and is thereafter downwardly reflected by the stationary mirror 51 in the vertical direction. The light is then again transmitted through the ¼ wave plate 50 in the opposite direction, as shown by the dashed line in FIG. 7, so that the light is converted into linearly polarized light having a difference in direction of 90° from that of the initial linearly polarized light.

Thereafter, the light is again reflected by the galvanomirror unit 5 (secondary reflection) to be returned to the beam splitter 52 in the opposite direction, where the light is reflected at an angle of 90° in the horizontal direction by the semitransparent film 52a of the beam splitter 52 to be made incident upon the movable mirror 7 and the objective lens 8.

Thus, the light from the laser source 1 is reflected twice by the galvanomirror unit 5 and is then made incident upon the objective lens 8. Consequently, a deflection angle $\theta$ (shown in FIG. 7), which is four times the rotation angle $\psi$ of the galvanomirror unit 5, is obtained. Namely, the tracking acceleration $\alpha$ of the focal point of the laser on the optical disc 9 is represented by the following equation;

$$\alpha = 4f\beta$$

wherein "f" designates the focal length of the objective lens 8 and "β" the angular acceleration of the galvanomirror unit 5, respectively.

Therefore, a slight angular displacement of the galvanomirror unit 5 causes the light to move in the radial direction of the optical disc 9 at a very high speed, resulting in an increase in the speed of tracking control.

In the illustrated embodiment, even though the light is reflected twice in the vertical direction by the galvanomirror unit 5 (primary and secondary reflections), and then reflected in the horizontal direction by the beam splitter 52, the direction of the linearly polarized light incident upon the objective lens 8 is the same as that of the linearly polarized light in a conventional optical disc apparatus since the direction of the linearly polarized light is changed by 90° when it is transmitted twice through the ¼ wave plate 50.

The beam splitter 52, which reflects the secondary reflection light from the galvanomirror unit 5 toward the objective lens 8, can be made of a single semitransparent glass or the like.

The following discussion will be directed to the internal construction of the galvanomirror unit 5 by way of example (FIGS. 2 through 5). Needless to say, the present invention is not limited thereto.

As mentioned above, the mirror 26 of the galvanomirror unit 5 faces upward and is inclined at an angle of 45° with respect to the horizontal plane (plane of the optical disc 9) and the vertical plane (plane normal to the plane of the optical disc 9). However, in the drawings, the mirror 26 lies in a horizontal plane or a vertical plane for easier explanation. Upon assembly, the galvanomirror unit 5 is mounted so that the mirror 26 is inclined at 45° with respect to the horizontal plane and the vertical plane.

A housing 22 of the galvanomirror unit 5 has a substantially square bottom plate 22c and vertical side walls 22a. A retainer 23 is provided on one corner of the housing 22, and a yoke 24 is mounted to the retainer 23. The mirror 26 (the reflecting surface) is supported by a plate-like torsion spring 25 which is supported at opposite ends thereof by the yoke 24.

The retainer 23 which is located at one corner of the housing 22 at an angle of 45° as mentioned above has a pair of orthogonal side surfaces 23a which are inclined at an angle of 45° with respect to the mirror 26 and which are in contact with the respective associated vertical side walls 22a. The retainer 23 is secured to the housing 22 by a set screw 27 extending through the bottom plate 22c and the associated vertical side wall 22a. The retainer 23 is provided on its front face with a conical recess 28 which has three holes 29, 30 and 31 extending therethrough.

Figure 4:
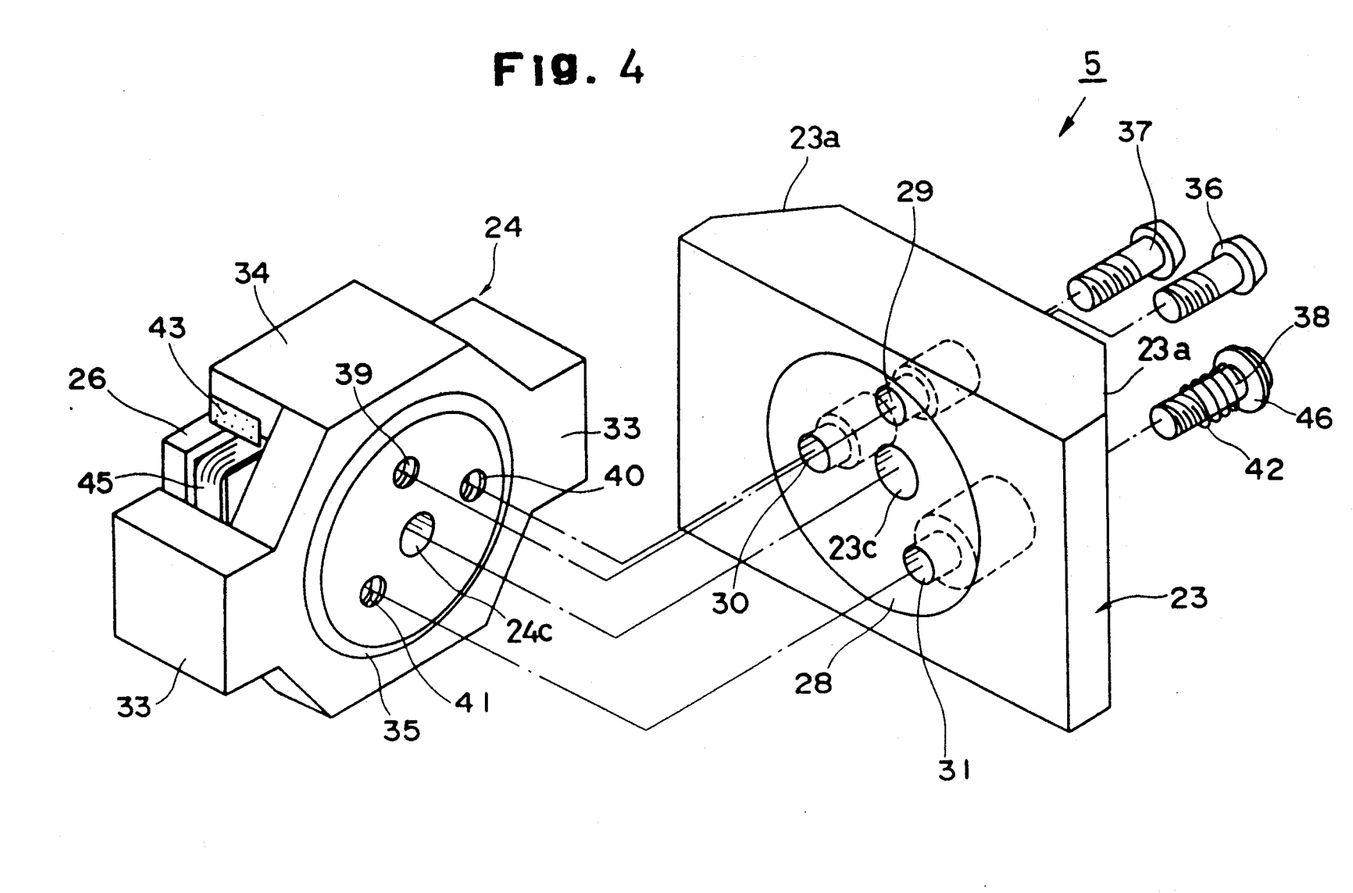
FIG. 4 is an exploded perspective view of a laser adjusting apparatus shown in FIG. 2.
Figure 5:
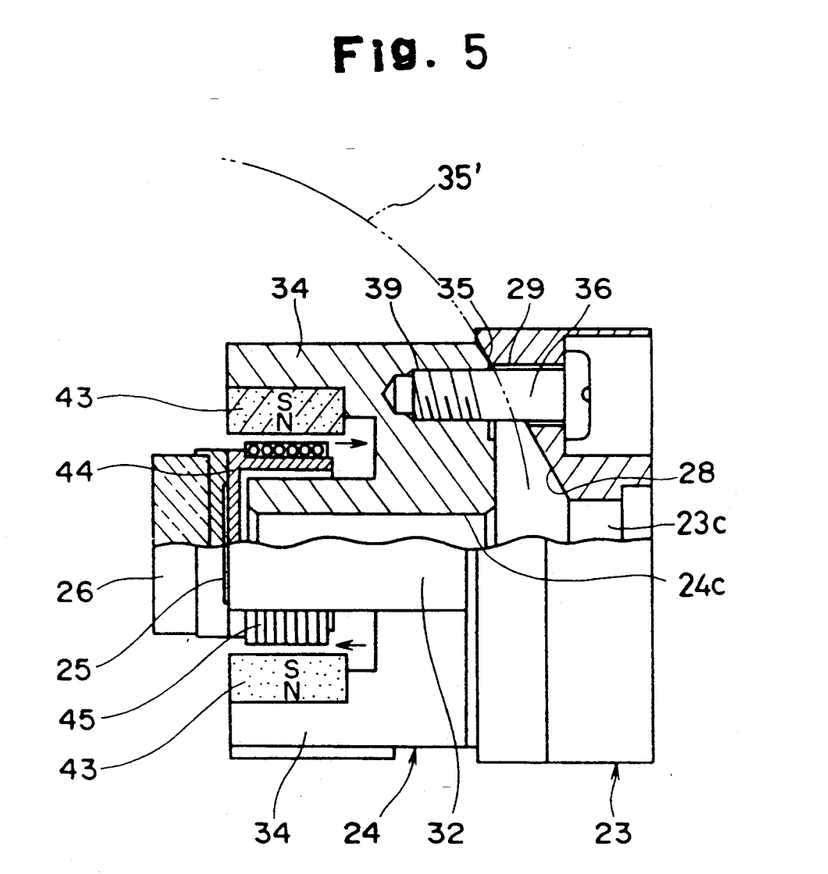
FIG. 5 is a longitudinal sectional view of the laser adjusting apparatus shown in FIG. 2.
Figure 6:
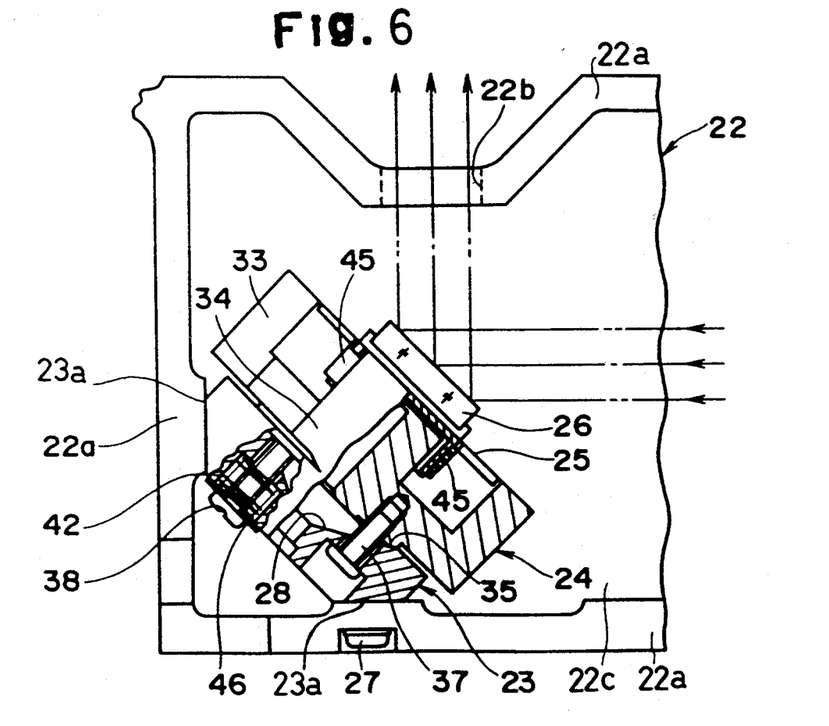
FIG. 6 is a partially sectioned plan view of the laser adjusting apparatus attached to a casing, shown in FIG. 2.

The yoke 24 has a central projection 32 and right and left projections 33 and upper and lower projections 34 on opposite sides of the central projection 32 in the horizontal and vertical directions, so that the yoke 24 is generally E-shaped in both the horizontal and vertical cross-sections. The yoke 24 is provided on its rear surface with a spherical zone projection 35 defined by a spherical segment less a smaller spherical segment cut off by a consecutive parallel plane as shown in FIG. 4. The spherical zone projection 35 can be fitted in the conical section recess 28 of the retainer. The spherical zone projection 35 is part of an imaginary sphere 35' (FIG. 5), the center of which lies in the plane of the reflecting surface of mirror 26. The spherical zone projection 35 is in movable contact with the inner surface of the conical recess 28 of the retainer 23. Three adjusting screws 36, 37 and 38 are screwed into the yoke 24 through the holes 29, 30 and 31 formed in the retainer 23 from behind, so that the yoke 24 is integrally supported by the retainer 23 thereby making possible an initial adjustment of the angular position of the yoke 24 in the vertical direction (direction corresponding to the rotation about some horizontal axis) and the horizontal direction (direction corresponding to the rotation about some vertical axis).

Namely, the first hole 29 is located directly above the center axes 23c and 24c connecting the centers of the retainer 23 and the yoke 24 in the vertical direction. The second hole 30 is located in the same horizontal plane as the center axes 23c and 24c, and the third hole 31 is located at a corner of an isosceles triangle, the two remaining corners of which lie on the axes of the first and second holes 29 and 30. The vertical adjustment screw 36 is inserted through the first hole 29 and screwed into a threaded hole 39 formed in the rear surface of the yoke 24, and the horizontal adjustment screw 37 is inserted into the second through hole 30 and screwed into a threaded hole 40 formed in the rear surface of the yoke 24, to secure the yoke 24 to the retainer 23. The final adjustment screw 38 is inserted through the third hole 31 and screwed into a threaded hole 41 formed in the rear surface of the yoke 24 through a washer 46. A compression spring 42 is provided between the washer 46 and the seat of the retainer 23 to bias the yoke 24 against the retainer 23 through the final adjustment screw 38 upon adjustment. The yoke 24 and the retainer 23 ar forcibly engaged by the bias of the compression spring 42 with a pressure which is dependent upon the depth to which the adjusting screws 36 and 37 are screwed. Upon completion of the horizontal and vertical adjustments, the final adjustment screw 38 is screwed-in to further compress the compression spring 42, thereby forcing the washer 46 against the retainer 23, so that the retainer 23 and the yoke 24 are firmly held together by the final adjustment screw 38.

The three adjusting screws, i.e., the vertical adjustment screw 36, the horizontal adjustment screw 37 and the final adjustment screw 38 are provided within the spherical zone projection 35.

The yoke 24 is provided with permanent magnets 43 on the inwardly facing surfaces of the upper and lower projections 34 which are spaced in the vertical direction. The torsion spring 25 which is in the form of an elongated leaf spring and which is provided on the front surface of the yoke 24 extends in the horizontal direction and is connected at the opposite ends thereof to the right and left projections 33. Mirror 26 is mounted on the front surface of the intermediate portion of torsion spring 25. The surface of the mirror 26 lies in a plane which cuts the imaginary sphere 35' of the spherical zone projection 35 into two hemispheres. At the intermediate portion on the rear surface of the torsion spring 25 is provided a frame (bobbin) 44 mounted thereto which surrounds the central projection 32. A coil 45 is wound around the frame 44. The coil 45 works in conjunction with the permanent magnets 43 on the projections 34 of the yoke 24 to comprise a voice coil connected to a servo circuit which is connected to the servo-sensor 21 shown in FIG. 1.

The housing 22 is provided with a window 22b through which the laser beam passes, so that the light reflected by the mirror 26 is emitted toward the beam splitter 6 through the window 22b.

As can be seen from the foregoing, according to the present invention, if a tracking error signal is output from the servo-sensor 21 in accordance with the light reflected from the optical disc 9, the electric current corresponding to the tracking error signal is supplied to the coil 45 of the galvanomirror unit 5. As a result of the operation of the voice coil, defined by the coil 45 and the permanent magnets 43, the upper and lower portions of the frame 44 are alternately moved backwards and forwards and at different angular displacements depending on the direction and intensity of the electric current supplied to the coil 45, respectively, so that a torsional deformation of the torsion spring 25 takes place. Namely, the torsion spring 25 rotates about a horizontal axis 5a which lies within the incident plane of the laser. Thus, the angular displacement of the mirror 26 mounted to the torsion spring 25 is controlled to adjust the tracking deviation.

I claim:

1. A laser adjusting apparatus, comprising:
a laser source;
a galvanomirror unit including a galvanomirror which reflects a laser beam from said laser source and means for adjusting the direction of said galvanomirror to change the direction of said laser beam reflected by said galvanomirror;
a second mirror which reflects primary reflection light reflected by said galvanomirror unit toward said galvanomirror unit;
means for reflecting light reflected by said second mirror, made incident upon and reflected by said galvanomirror unit; and
an optical disc upon which said laser beam is made incident by said galvanomirror of said galvanomirror unit, wherein said second mirror has a stationary reflecting plane that is parallel with said plane of said optical disc.

2. A laser adjusting apparatus according to claim 1, wherein said reflecting means comprises a semitransparent film which permits said laser beam emitted from said laser source toward said galvanomirror unit to pass therethrough and reflects said light on said galvanomirror unit.

3. A laser adjusting apparatus according to claim 1, wherein said galvanomirror of said galvanomirror unit faces upward at an inclination angle of substantially 45° with respect to a plane of said optical disc.

4. A laser adjusting apparatus according to claim 1, wherein said direction adjusting means rotates said galvanomirror about a horizontal axis lying in substantially the same plane as the incident laser beam.

5. A laser adjusting apparatus according to claim 1, further comprising an objective lens which converges said laser beam reflected by said reflecting means in the radial direction of said optical disc onto a predetermined track of said optical disc.

6. A laser adjusting apparatus according to claim 5, further comprising a reflecting mirror for reflecting said laser beam reflected by said reflecting means in the radial direction of said optical disc to be made incident upon said objective lens.

7. A laser adjusting apparatus according to claim 6, wherein said objective lens and said reflecting mirror are together movable in the radial direction of said optical disc.

8. A laser adjusting apparatus, comprising:
a laser source;
a galvanomirror unit including a galvanomirror which reflects a laser beam from said laser source and means for adjusting the direction of said galvanomirror to change the direction of said laser beam reflected by said galvanomirror;
a second mirror which reflects primary reflection light reflected by said galvanomirror unit toward said galvanomirror unit;
means for reflecting light reflected by said second mirror, made incident upon and reflected by said galvanomirror unit;
an optical disc upon which said laser beam is made incident by said galvanomirror of said galvanomirror unit;
an objective lens that converges said laser beam reflected by said reflecting means in a radial direction of said optical disc onto a predetermined track of said optical disc;
a reflecting mirror for reflecting said laser beam reflected by said reflecting means in said radial direction of said optical disc to be made incident upon said objective lens, said objective lens and said reflecting mirror being movable in said radial direction of said optical disc; and
a ¼ wave plate that is positioned between said galvanomirror unit and said second mirror.

9. A laser adjusting apparatus according to claim 8, wherein said galvanomirror unit changes the direction of said laser beam within a plane lying substantially in the radial direction of said optical disc and substantially normal to the plane of said optical disc.

10. An optical disc apparatus, comprising;
a laser source;
a beam splitter having a semitransparent film which permits light which is linearly polarized in a first direction and emitted from said laser source to pass therethrough, and reflects light which is linearly polarized in a direction different from said first direction by 90°, in the direction of an optical disc;
a galvanomirror unit including a galvanomirror which upwardly reflects a laser beam transmitted through said beam splitter at a substantially right angle, and means for adjusting the direction of said laser beam reflected by said galvanomirror by rotating said galvanomirror about a horizontal axis lying in a plane incident to a plane of said laser beam to change the direction of said laser beam reflected by said galvanomirror;
a second mirror which reflects said laser beam reflected by said galvanomirror unit toward said galvanomirror unit;
a ¼ wave plate provided between said second mirror and said galvanomirror unit; and
a reflecting mirror and an objective lens for converging said laser beam reflected by said semitransparent film of said beam splitter onto a predetermined track of said optical disc.

11. A galvanomirror unit having a galvanomirror from which a laser beam from a laser source is reflected toward an objective lens which is linearly movable in the radial direction of an optical disc, comprising a stationary mirror which reflects a primary reflection light reflected from said galvanomirror to return it to said galvanomirror, and a semitransparent film provided between said laser source and said galvanomirror to reflect a secondary reflection light from said galvanomirror toward said objective lens.

12. A galvanomirror unit according to claim 11, further comprising a ¼ wave plate between said galvanomirror and said stationary mirror.

* * * * *

UNITED STATES PATENT AND TRADEMARK OFFICE
CERTIFICATE OF CORRECTION

PATENT NO. : 5,247,508
DATED : September 21, 1993
INVENTOR(S) : Akihiro Tanaka

It is certified that error appears in the above-indentified patent and that said Letters Patent is hereby corrected as shown below:

Title page, item [54], and col. 1, line 1, delete "APPARATUS" after "ADJUSTING".

Column 8, line 38 (claim 10, line 8) insert--radial before "direction".--

Signed and Sealed this

Twenty-first Day of October 1997

Attest:

BRUCE LEHMAN

Attesting Officer

Commissioner of Patents and Trademarks